(12) United States Patent
Samuels et al.

(10) Patent No.: US 7,105,106 B2
(45) Date of Patent: Sep. 12, 2006

(54) LIQUID CRYSTALLINE POLYMERS, PROCESSES FOR THEIR MANUFACTURE, AND ARTICLES THEREOF

(75) Inventors: Michael Robert Samuels, Wilmington, DE (US); Marion Glen Waggoner, Landenberg, PA (US); Julius Uradnisheck, Glen Mills, PA (US)

(73) Assignee: E. I. du Pont de Nemour and Company, Wilmington, DE (US)

( * ) Notice: Subject to any disclaimer, the term of this patent is extended or adjusted under 35 U.S.C. 154(b) by 105 days.

(21) Appl. No.: 10/618,319

(22) Filed: Jul. 11, 2003

(65) Prior Publication Data
US 2004/0058092 A1   Mar. 25, 2004

Related U.S. Application Data

(60) Provisional application No. 60/395,369, filed on Jul. 12, 2002.

(51) Int. Cl.
C09K 19/38 (2006.01)
C09K 19/52 (2006.01)
C08G 63/16 (2006.01)
C08G 63/60 (2006.01)
B32B 27/10 (2006.01)

(52) U.S. Cl. ............... 252/299.01; 252/299.62; 252/299.67; 428/34.2; 428/480; 524/601; 524/604; 524/605; 525/444; 528/176; 528/193

(58) Field of Classification Search ........... 252/299.01, 252/299.6, 299.62, 299.63, 299.67; 428/1.1, 428/34.2, 480; 524/466, 493, 601, 604, 605; 525/444; 528/176, 193
See application file for complete search history.

(56) References Cited

U.S. PATENT DOCUMENTS

| | | | |
|---|---|---|---|
| 3,778,410 A | 12/1973 | Kuhfuss | |
| 3,804,805 A | 4/1974 | Kuhfuss | |
| 4,767,830 A | 8/1988 | Kageyama | |
| 4,814,417 A * | 3/1989 | Sugimori | 528/182 |
| 4,892,912 A | 1/1990 | Hayashi | |
| 5,110,896 A * | 5/1992 | Waggoner et al. | 528/190 |
| 5,250,654 A * | 10/1993 | Alms et al. | 528/193 |
| 5,326,848 A | 7/1994 | Kashimura | |
| 5,397,502 A * | 3/1995 | Waggoner et al. | 252/299.01 |
| 5,466,773 A * | 11/1995 | Samuels et al. | 528/194 |
| 5,525,700 A * | 6/1996 | Samuels et al. | 528/190 |
| 5,710,237 A * | 1/1998 | Waggoner et al. | 528/190 |
| 5,804,634 A * | 9/1998 | Umetsu et al. | 524/466 |
| 5,817,384 A * | 10/1998 | Furuta et al. | 428/1.55 |
| 5,998,804 A | 12/1999 | Suh | |
| 6,022,491 A * | 2/2000 | Samuels et al. | 252/299.01 |
| 2004/0140450 A1 * | 7/2004 | Waggoner et al. | 252/299.01 |

FOREIGN PATENT DOCUMENTS

| | | |
|---|---|---|
| EP | 345 869 | 12/1989 |
| EP | 398 624 | 11/1990 |
| EP | 926 175 | 12/1995 |

* cited by examiner

*Primary Examiner*—Shean C. Wu

(57) ABSTRACT

Thermotropic liquid crystalline polymers are produced by the reaction of a polyester made from an aromatic dicarboxylic acid and a diol, one or more hydroxycarboxylic acids, a stoichiometric excess of an aromatic diol, and a carboxylic acid anhydride. Also disclosed are novel liquid crystalline polymers that may be produced by this process. These liquid crystalline polymers are useful as molding resins and shaped articles thereof are produced. In particular, the articles include films, sheets, containers and portions thereof comprising these LCPs.

25 Claims, No Drawings

LIQUID CRYSTALLINE POLYMERS, PROCESSES FOR THEIR MANUFACTURE, AND ARTICLES THEREOF

CROSS REFERENCE TO RELATED APPLICATIONS

This application claims the benefit of U.S. Provisional Application No. 60/395,369, filed Jul. 12, 2002.

FIELD OF INVENTION

This invention concerns novel thermotropic liquid crystalline polymers, processes for making them, and articles thereof.

BACKGROUND OF INVENTION

Thermotropic liquid crystalline polymers (LCPs) made from a partially aromatic polyester such as poly(ethylene terephthalate) (PET), and one or more aromatic hydroxycarboxylic acids such a p-hydroxybenzoic acid (HBA) are well known, see for instance U.S. Pat. Nos. 3,778,410 and 3,804,805.

U.S. Pat. No. 4,892,912 describes the preparation of LCPs from a partially aromatic polyester, an acyloxyaromatic carboxylic acid, and a diacyloxyaromatic compound. The polymers produced are said to be more uniform in composition and can have higher molecular weights. The use of carboxylic acid anhydrides is not mentioned.

B. A. Yul'chibaev, et al., *Vysokolekulyamye Soedineniya*, Ser. B, vol. 37, (1995), pp. 166–171 describes the synthesis of LCPs from partially aromatic polyester, acetoxybenzoic acid, and diacetoxyhydroquinone in the presence of acetic acid. The use of carboxylic acid anhydrides is not mentioned.

U.S. Pat. No. 5,326,848 describes an LCP with repeat units derived from ethylene glycol (EG), 6-hydroxy-2-naphthoic acid (HNA), p-hydroxybenzoic acid (HBA), and terephthalic acid (T). The EG and T may be added "together" in the form of PET. It is mentioned that this LCP can be made by reaction of acyloxy derivatives of the EG, HNA and HBA, or that these compounds may be acylated in situ by using a carboxylic acid anhydride, but in the latter case a solvent is required to be present to produce high quality LCP. No mention is made of using a stoichiometric excess of any ingredient. This LCP is reported to have good oxygen barrier properties and to be useful in packaging.

Conventional (non-LCP) copolyester resins are known that provide low melt processing temperatures, isotropic properties, and good optical properties. This class of copolyester incorporates aliphatic moieties and alicyclics and consequently they exhibit high permeation properties (>160 cm$^3$ oxygen 25 μm/m$^2$ day atm).

Conventional LCP polyesters are known to provide good oxygen barrier properties, but they tend to be anisotropic and therefore weak in the direction transverse to melt flow, they have low elongation-to-break, and they tend to be opaque. The often also require high temperatures (>300 C) for melt processing. Some LCPs exhibit barrier values as low as 0.3 cm$^3$ oxygen 25 μm/m$^2$ day atm but require die head temperatures of 320° C. These properties tend to diminish their usefulness in many packaging applications as films and containers. Most packaging film processes require the barrier resin to be co-melt processed with structural resins and co-extrudable adhesives that can start to decompose at 275° C. The products of decomposition can introduce gel defects to extruded film or introduce odor or undesirable flavors to packaged food. It is therefore beneficial that the barrier resin be melt-processible into films and other articles below 275° C. and preferably below 230° C.

SUMMARY OF THE INVENTION

This invention provides a liquid crystalline polymer comprising repeat units of the formulae

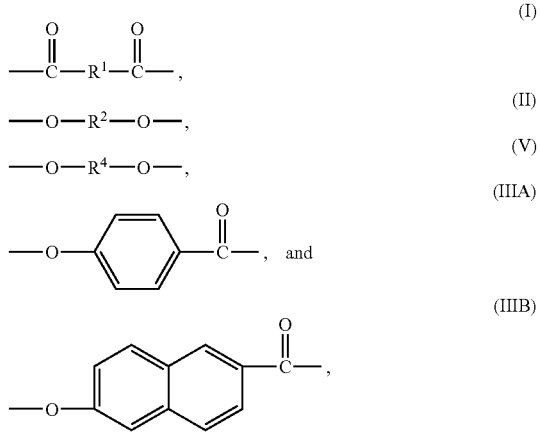

wherein:
each $R^1$ is independently hydrocarbylene or substituted hydrocarbylene;
each $R^2$ is independently saturated hydrocarbylene or substituted saturated hydrocarbylene;
each $R^4$ is independently arylene or substituted arylene;
(V) is about 0.4 to about 32 mole percent of the total of (I) present;
the molar ratio of (I):[(II)+(V)] is about 1.0:1.0;
the molar ratio of (I):[(IIIA)+(IIIB)] is about 1.0:1.0 to about 1.0:4.0; and
the molar ratio of (IIIA):(IIIB) is about 5:1 to about 1:2.

This invention includes a process for the manufacture of a liquid crystalline polymer comprising:

(a) contacting, in the absence of added solvent, a partially aromatic polyester, having repeat units of the formula

and

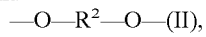

with one or more compounds of the formula HO—R$^3$—CO$_2$H (III), one or more compounds of the formula HO—R$^4$—OH (IV), and a carboxylic acid anhydride, under conditions to form esters of (III) and (IV) by reaction with said carboxylic acid anhydride, and (b) heating the mixture resulting from (a) at a temperature and for a sufficient amount of time to form a liquid crystalline polymer wherein each $R^1$ is independently hydrocarbylene or substituted hydrocarbylene;
each $R^2$ is independently alkylene or substituted alkylene;
each $R^3$ is independently arylene or substituted arylene;

each $R^4$ is independently arylene or substituted arylene;

and provided that (IV) is present in an amount, based on the amount of (II) present in said partially aromatic polyester, to achieve a total diol stoichiometric excess of 0.5 to 15 mole percent.

LCPs of this invention and LCPs produced by LCP manufacturing processes of this invention usually have good barrier properties to oxygen, moisture, organic liquids such as automotive fuels such as gasoline and diesel fuel, carbon dioxide and in addition have good thermoforming capabilities (that is films or sheets containing one or more layers of LCP may be readily thermoformed). Furthermore these LCPs can often be processed a temperatures below 250° C. These properties make the LCPs of this invention particularly useful in packaging applications, for example part (e.g. a layer) of a multilayer film that is part of the packaging of an item, or simply as part of, or a layer in, a package or container such as a bottle or pouch.

Accordingly, this invention further provides shaped articles comprising the LCPs described above, including films, sheets, packages, containers and portions or components thereof, and the like.

This invention also concerns a process for coating paper with a liquid crystalline polymer, comprising, contacting a surface of a paper sheet with a molten sheet of liquid crystalline polymer to form a coated paper sheet, then while said liquid crystalline polymer on said coated paper sheet is still at least partially molten applying pressure by having a surface which contacts said liquid crystalline polymer on coated paper sheet, said surface having a temperature below a solidification temperature of said liquid crystalline polymer and which applies pressure to said liquid crystalline polymer on coated paper sheet to produce a liquid crystalline polymer coated paper sheet wherein said liquid crystalline polymer is solid.

DETAILED DESCRIPTION OF PREFERRED EMBODIMENTS

Herein certain terms are used, and they are defined below.

By "liquid crystalline polymer" is meant a polymer that is anisotropic when tested by the TOT test as described in U.S. Pat. No. 4,118,372, or an equivalent test.

By "hydrocarbylene" is meant a divalent radical containing carbon and hydrogen which has two free single bonds, these bonds being connected to a single carbon atom or two different carbon atoms.

By "saturated hydrocarbylene" is meant a divalent radical in which the two free single bonds are to the same or different carbon atoms, and the carbon atom(s) to which these bonds are attached are saturated, that is there are no multiple (double or triple) bonds to those carbon atoms.

By "arylene" is meant a divalent radical wherein each of the two free valencies is associated with a different carbon atom of one or more aromatic rings. If more than one aromatic ring is present it may be connected to other aromatic rings present as a fused ring as in naphthalene, connected by a covalent bond as in biphenyl, or connected by another group as in diphenyl ether, or any combination of these.

By "alkylene" herein is meant a divalent radical derived from an alkane from which two hydrogen radicals have been removed to form the alkylene radical. The two free valencies, which are single bonds, may be to the same or different carbon atoms.

By "substituted" (as in substituted hydrocarbylene, substituted arylene, etc.) herein is meant a radical that contains one or more substituent groups that are inert under the process conditions to which the compound or polymer containing these groups is subjected. The substituent groups also do not substantially interfere with the process. In a substituted radical all of the hydrogens may be replaced by substituents, as in trifluoromethyl.

By "stoichiometric excess" herein is meant an excess of a type of monomer present in a condensation polymer such as a polyester. The stoichiometric amount actually required in such a polymer is determined by the normal polymerization process and chemistry of the polymer formation. For example, when making a substantially linear polyester containing one or more diols and one or more dicarboxylic acids, normally to achieve high molecular weight polymer the total number of moles of diol(s) added to the polymerization will equal the total number of moles of dicarboxylic acid(s) added to the polymerization. If this ratio is not 1:1, then the ingredient present in the greater molar amount is present in stoichiometric excess. In particular, if the total molar amount of diol moieties is greater than the total molar amount of dicarboxylic acids, then the diol(s) are considered to be in stoichiometric excess. In such a case, the molar amount of diol(s) in stoichiometric excess may comprise a single diol or a combination of any or all of the diols present. Some types of monomers which are "self polymerizing" such as hydroxyacids in polyesters can never be present in stoichiometric excess because they contain both functional groups necessary to form the polymer.

The term "containers" used herein means shaped articles principally suited for use in packaging or containing foods, medicines, agrochemicals, industrial liquids and the like, and the "containers" include sheets and films, as well as bottles, trays, cups, bags and like bottomed containers.

By "absence of added solvent" herein is meant that a compound is not added to the process solely to act as a solvent. Compounds generated within the process which may also be solvents are also not included in "added solvent". Solvents herein are used in the sense as they are described in U.S. Pat. No. 5,326,848, which is hereby included by reference. Among these solvents are carboxylic acids, such as acetic acid. Specifically excluded from the class of "added solvents" are carboxylic acid anhydrides such as acetic anhydride, and carboxylic acids such as acetic which are generated by chemical reactions during the process. Such reactions include acetylation with a carboxylic acid anhydride and transesterification of carboxylate ester with a carboxylic acid to form a polymer.

If not otherwise stated, radicals (groups) herein containing carbon atoms preferably contain from 1 to 30 carbon atoms. Unless otherwise stated, preferred structures for various groups and radicals are preferred for both the processes and compositions described herein.

It is preferred that $R^1$ is arylene, more preferred that $R^1$ is one or more of p-phenylene, m-phenylene, 2,6-naphthylene, and 4,4'-biphenylene, especially preferred that $R^1$ is p-phenylene or 2,6-naphthylene. In another preferred form, from 90 to 99.5 mole percent of $R^1$ is p-phenylene, and 0.5 to 10 mole percent of $R^1$ is m-phenylene. It is especially preferred that $R^1$ is 100 mole percent p-phenylene.

It is preferred that $R^2$ is independently alkylene or substituted alkylene, especially preferred that $R^2$ is alkylene or substituted alkylene containing 2 to 10 carbon atoms in the alkylene chain, more preferred that $R^2$ is —$(CH_2)_n$— wherein n is an integer of 2 through 10, more preferably n is 2, 3 or 4, even more preferably n is 2. It is well known that in some syntheses of PET, some of the repeat units derived from diols are —$CH_2CH_2OCH_2CH_2$—, apparently made as the result of a side reaction in the polymerization. Accordingly, in another preferred form, 90.0 to 99.9 mole percent of $R^2$ is —CH$_2$CH$_2$— and 0.1 to 10.0 mole percent of $R^2$ is —CH$_2$CH$_2$OCH$_2$CH$_2$—.

Any preferred forms of $R^1$ may be combined in any way with any preferred forms of $R^2$ to form the partially aromatic polyester, and be present in any resulting LCP. A preferred partially aromatic polyester is poly(ethylene terephthalate) (PET). More than one polyester may be used as the partially aromatic polyester, for example a combination of PET and poly(ethylene 2,6-napthalate).

It is preferred that $R^3$ is one or more of p-phenylene, m-phenylene, and 2,6-naphthylene. In more preferred forms, $R^3$ is p-phenylene, 2,6-naphthylene, or a combination of p-phenylene and 2,6-naphthylene.

It is preferred that $R^4$ is one or more of p-phenylene, m-phenylene, 2,6-naphthylene, or 4,4'-biphenylene, more preferably is p-phenylene or 4,4'-biphenylene, and especially preferably 4,4'-biphenylene. Other useful groups for $R^4$ are 2-methyl-p-phenylene, and 2-t-butyl-p-phenylene.

A preferred liquid crystalline polymer is one comprising repeat units of the formulae

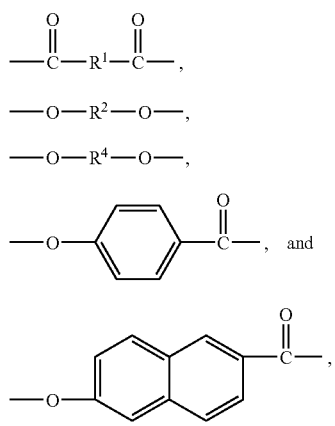

wherein
from 90 to 100 mole percent of $R^1$ is p-phenylene, and from 0 to 10 mole percent of $R^1$ is m-phenylene;
from 90.0 to 100 mole percent of $R^2$ is —CH$_2$CH$_2$— and from 0 to 10.0 mole percent of $R^2$ is —CH$_2$CH$_2$OCH$_2$CH$_2$—;
each $R^4$ is 4,4'-biphenylene;
(V) is from about 1 to about 3 mole percent of the total of (I) present;
the molar ratio of (I):[(II)+(V)] is about 1.0:1.0; and the total amount of the repeat unit (I+V) plus the repeat unit (I+III) is from about 25 to about 35 mole percent of said liquid crystalline polymer;
the amount of (IIIA) is from about 45 to about 55 mole percent of said liquid crystalline polymer; and
the amount of (IIIB) is from about 15 to about 25 mole percent of said liquid crystalline polymer.

Especially preferred is the liquid crystalline polymer above wherein the total amount of the repeat unit (I+V) plus the repeat unit (I+II) is from about 28 to about 32 mole percent of said liquid crystalline polymer;
the amount of (IIIA) is from about 48 to about 52 mole percent of said liquid crystalline polymer; and
the amount of (IIIB) is from about 18 to about 22 mole percent of said liquid crystalline polymer.

In the process for the manufacture of a liquid crystalline polymer as described above, it is preferred that the carboxylic acid anhydride is an aliphatic carboxylic acid anhydride, in other words that it be derived from an aliphatic carboxylic acid such as acetic acid, propionic acid, butyric acid, isobutyric acid, etc. A preferred carboxylic acid anhydride is acetic anhydride. The amount of acetic anhydride added is preferably about 95 to about 125 mole percent, more preferably about 100 to about 110 mole percent of that required to acylate all of the free hydroxyl groups in the polymerization, for example those contained in (III) and (IV).

In the process for manufacture of an LCP described herein a general procedure is to heat and agitate all of the ingredients together to acylate the hydroxyl compounds present (for example at reflux for about 0.25 to 5 hours), raise the temperature slowly to remove byproduct carboxylic acid by distillation and initiate formation of prepolymer (oligomer). At some point, usually when most of the byproduct carboxylic acid has been removed, vacuum is slowly applied to finish the polymer, i.e., bring it up to final molecular weight. It may be necessary to raise the polymer temperature to keep the polymer above its melting point so it will not solidify during finishing. When the polymer has reached the desired molecular weight (this can be determined by, for instance, measuring the torque needed to turn the agitator) the vacuum is released and the polymer is cooled and isolated. The times and temperatures needed for this operation are readily determined by experimentation, and depend to some extent on the monomers used, the final composition of the polymer obtained (for example its melting point), and the desired molecular weight of the polymer. See also the Examples herein.

As noted above, a stoichiometric excess of (IV) of about 0.5 to about 15 mole percent, based on the amount of (II) present (either in free diol form or incorporated in the partially aromatic polymer) is preferably present in a preferred first process. More preferably this stoichiometric excess is about 1.0 to about 12 mole percent, based on the amount of (II) present; even more preferably about 1.0 to about 3 mole percent, based on the amount of (II) present. It is noted that in the process for LCP manufacture a dicarboxylic acid may be present, particularly an aromatic dicarboxylic acid of the formula HO$_2$CR$^5$CO$_2$H (VIII) wherein $R^5$ is arylene, more preferred that $R^5$ is one or more of p-phenylene, m-phenylene, and 2,6-naphthylene, and especially preferred that $R^5$ is p-phenylene. If (VIII) is present, it will "require" that a stoichiometric amount of (IV) be present to "balance" (react with) the (VIII). Therefore when calculating the amount of stoichiometric excess of (IV) present, one would first subtract from the amount of (IV) present the amount of (IV) needed to react with (VIII) and the remainder of (IV) present would be used in the stoichiometric excess calculation. Preferably the amount of (VIII) used (if any) in the LCP manufacturing process is no more than about 25 mole percent, more preferably no more than about 10 mole percent, of the amount of (I) present in the process. In a preferred LCP, (VIII) would be part of (I) as a repeat unit.

In a preferred LCP herein it is preferred that [especially when (VIII) is present in the LCP manufacturing process] (V) is about 0.5 to about 23.0 mole percent of the total of (I) present. It is also preferred [especially when (VIII) is not present in the LCP manufacturing process] that (V) is about 0.5 to about 15.0, more preferably about 1.0 to about 12, and especially preferably about 2.0 to about 10 mole percent of the total of (I) present.

It is also preferred that the molar ratio of (I):[(IIIA)+(IIIB)] is about 45:55 to about 25:75. It is also preferred that the molar ratio of (IIIA):(IIIB) is about 3:1 to about 1:1.

Any of the ranges of compositions of the various components of LCPs of this invention can be combined with the ranges of any other components, and preferred specific components and their concentration ranges are preferred in both the LCP manufacturing process and the LCPs themselves described herein.

A problem in the art has to been to produce LCPs of the type described herein that are uniform in composition (and hence exhibit uniformity in processing such as little or no gel-like materials), and to make polymer with higher molecular weights (higher inherent viscosities), and particularly to accomplish these two goals simultaneously. Surprisingly the present process accomplishes these goals, producing uniform, easily processible polymers of higher inherent viscosities, without the addition of materials such as solvents such as acetic acid which are not normally added to most LCP polymerization reactions. This is advantageous in terms of the size of the reaction vessels needed, the process time (no time needed to remove the "solvent" by distillation), and the amount of energy needed, and the need to store additional chemicals.

It is preferred that the LCPs of this invention and/or from the present process are melt processable below 250° C., more preferably about 190° C. to about 230° C., and especially preferably about 190° C. to about 220° C. Preferably the LCP has an oxygen permeability of less than 0.25 $cm^3 \cdot mil/100\ in^2 \cdot day \cdot atmosphere$, and/or water permeability of less than 0.1 $cm^3 \cdot mil/100\ in^2 \cdot day \cdot atmosphere$, and/or oxygen permeability of less than 0.25 $cm^3 \cdot mil/100\ in^2 \cdot day \cdot atmosphere$ after being heated at 121° C. for 30 min. See below for methods for measuring permeabilities to oxygen and water.

LCPs of this invention are often "amorphous" (i.e. have very low levels of crystallinity), particularly when tested for a melting point by Differential Scanning Calorimetry. Often no melting endotherm is found in such analyses, which indicates no or low crystallinity.

After formation by the above described process or any other process, if desired the LCPs of this invention may be reduced in molecular weight by reaction with a monomeric functional compound, as described in U.S. Pat. No. 6,294,618 (see for instance claim 1), which is hereby included by reference. A preferred functionality is hydroxyl, a preferred functional compound is a diol, and a preferred diol is hydroquinone or 4,4'-biphenol. Once the process of this patent has been carried out it is believed that the molecular weight (or inherent viscosity or melt viscosity, all measures of the molecular weight) is more stable when the polymer is heated, for instance in forming useful articles from the polymers. Polymer treated by the process of this patent is useful for all of the uses and in all of the items described herein for these LCPs. Preferably the melt viscosity of the LCP is reduced by at least about 10% at a shear rate of 1000 $sec^{-1}$, using the analytical method of U.S. Pat. No. 6,294,618.

The LCPs of this invention can be melt processed into various shaped articles by known processes for conventional polymers and are particularly suited for forming sheets and films. Hollow shaped articles can be produced by extrusion processes or what is specifically known as blown film processes, injection stretch blow molding, extrusion blow molding, uniaxial or biaxial stretching, extrusion casting, pultrusion, extrusion coating, thermoforming, sheet folding and heat sealing (form-fill-seal) or like processes.

The LCPs of this invention can be formed into multilayer structures with other polymers, e.g. polyolefin resins such as polyethylene, polypropylene, polyethylene-co-vinyl acetate, saponified polyethylene-co-vinyl acetate, polyethylene-co-methacrylate, polyethylene-co-methacrylic acid; polyester resins such as polybutylene terephthalate, polyethylene terephthalate copolymer and polyethylene naphthalate; and polyamide resins such as nylon 66/6 copolymer. Thus, multilayer films, sheets, tubes, hoses and the like can be produced by co-extrusion, sheet extrusion and axial heat sealing, extrusion coating, powder coating and sintering, thermal lamination, or like processes. Laminated containers such as trays, cups and bottles can be produced by injection molding, blow molding, injection stretch blow molding, thermoforming, vacuum forming, compression molding or like molding or forming processes.

Films obtained from the liquid crystalline polymers of this invention can be made that have contact transparency when they are thin, and for example most extruded films having a thickness of 25 μm or less have sufficient transparency. Such transparent films are seldom obtainable from previously described liquid crystalline polyesters.

Shaped articles such as tubing, film or sheets obtained from the LCPs of this invention can be heat stretched uniaxially or biaxially. In most cases the film can be heat stretched by at least 2×2 times or at least 3×3 times simultaneously or sequentially. The LCPs described herein often have moldability, formability and stretchability improved over conventional liquid crystal polyesters.

In addition to having good thermoforming capabilities, LCPs of this invention and LCPs produced by LCP manufacturing processes of this invention have good barrier properties to oxygen, moisture, carbon dioxide, organic liquids such as automotive fuels such as gasoline and diesel fuel, and flavors.

As a result the LCPs of this invention are useful in applications for packaging beverages such as carbonated beverages, orange juice, apple juice, grape juice, other fruit juices and milk; solid foods such as meats, cheese, fish, poultry, nuts, coffee, applesauce or other sauces, stews, dried fruit, food paste, soups and soup concentrates and other edible items; spices; condiments such as ketchup, mustard, and mayonnaise; pet food; cosmetics; personal care products such as toothpaste, shaving foam, soaps, shampoos, lotions and the like; pharmaceuticals; fragrances; electronic components; industrial chemicals or household chemicals such as fragrant laundry detergent, fragrant fabric softener; agrochemicals, medical devices; medicinal liquids; fuels; and biological substances.

The containers and packaging materials can be of various shapes including trays, cups, caps, or lids prepared from sheets by vacuum or pressure forming; shapes prepared by deep drawing an unstretched sheet (i.e. thermoforming); shapes prepared by extrusion blow molding or biaxial stretching blowing parisons (injection stretch blow molding) and the like; shapes prepared by injection molding, compression molding or other molding processes; and shapes prepared by folding a sheet and heat sealing its edges such as a gable-topped carton.

The containers or packaging materials comprising the LCPs of this invention include, in addition to those formed of the LCP alone, those comprising a blend of the LCP and another resin, those comprising multilayered structures comprising layers of other resins, those comprising a laminar structure comprising the LCP, and those coated with the LCP. Examples of the other resins are polyolefin resins such as polyethylene and polypropylene, polyester resins such as polyethylene terephthalate and polybutylene terephthalate and polyamide resins such as nylon and thermoplastic polyamide elastomers.

Thus, the LCPs of this invention are useful in a wide variety of shaped articles used in packaging applications, including for example but not limited to the following containers or portions of containers, films and sheets. The term "comprising" in these uses means the LCP and/or other named ingredient(s) may be present alone or with other (unnamed) materials.

1) Containers comprising these LCPs.

2) Containers of 1) wherein these LCPs are in the form of films or sheets. The films or sheets may be in the form of single layers which are all or partially these LCPs, or multilayer films, comprising one or more layers comprising LCPs of this invention, the LCP-containing layer(s) being all LCP or partially LCP.

3) Films less than 250 µm thick composed entirely of these LCPs.

4) Multicomponent films less than 250 µm thick comprising these LCPs as a blend or an LCP-containing layer being all LCP or partially LCP.

5) A film or sheet of 2) bonded to a substrate selected from the group consisting of paper, paperboard, aluminum foil, fabric, nonwoven material, or to a film substrate comprising another polymer selected from the group consisting of poly(vinylidene fluoride) or polyamide (nylon) 66, biaxially oriented polypropylene or poly(ethylene terephthalate), and polyimide by lamination, extrusion coating or co-extrusion coating.

6) Multicomponent films of 4) in which these LCPs comprise one or both layers on the outside surfaces of the film.

7) Films of 3) or 4) that have at least one layer that has been oriented and partially heat set such that the total structure shrinks (in any direction) at least 4% when heated above 90° C.

8) Films of 3) or 4) that can be stretched at least 5% without rupture of the film.

9) Containers of 1) where these LCPs are or are part of a heat sealable layer.

10) Films of 3) or 4), wherein these LCPs have near-balanced molecular orientation in the transverse versus machine directions as indicated by similar tensile moduli.

11) Containers of 1) in the form of squeezable tubes, pouches or bottles.

12) Containers of 1) in the form of pouches or bags.

13) Containers of 1) in the form of cylinders, conduits, pipes, hoses or tubes.

14) Single layer sheets more than 10 mils thick comprising these LCPs.

15) Multicomponent sheets more than 250 µm thick comprising these LCPs as a blend or an LCP-containing layer being all LCP or partially LCP.

16) Containers having at least one opening and comprising a layer of LCP (for example by thermoforming from sheets of 15 or injection molding or compression molding LCP with another polymer or lining with 3) or 4)) including but not limited to trays, tubs, cups, bowls, cans, buckets, pails, and bottles.

17) Containers formed from or lined with 4) or 5) including but not limited to boxes, cartons, tubes, pouches, bowls, trays.

18) Containers of 1) that are rigid containers comprising these LCPs, including but not limited to trays, cups, cans, buckets, tubs, boxes, pipes, bowls, tubes, parisons, and cartons.

19) A component of a container (such as a cap, cap liner, lid, screw top, or other closure) comprising these LCPs.

20) Protective coatings composed of these LCPs such as but not limited to protection of metal or electronic components from oxidation.

21) Containers of 1) that are retortable, steam sterilized and/or microwaveable such as but not limited to cups, bowls, pouches, and tubes.

22) Containers of 1) containing fuel components such as gasoline, methane, methanol, oxygen.

23) Containers of 1) that also comprise a scavenging layer which as for scavenging oxygen, moisture, or odors.

24) Containers of 1) that comprise another barrier layer such as a metal foil layer; metal, silica, alumina, or carbon coated film layer; polyvinylidene chloride; or polyglycolic acid.

25) Containers of 1) that are under vacuum or contain a vacuum.

26) Containers of 1) that contain a gas or gases.

27) Containers of 26) that are balloons, inflatables, or pillows.

28) Containers of 1) or container components 19) or sheets 14) or 15) that additionally comprise a pigment.

29) Films of 3) or 4) that have contact or read-through clarity.

30) Rigid containers of 18) in which a heat-sealable layer comprises these LCPs.

31) Articles that are coated with a continuous layer of these polymers.

32) Articles that are partially coated with a layer of these polymers.

33) Bags or pouches of 12) within a rigid container that dispense liquids such as wine, medical fluids, or baby formula.

34) Containers of 1) that are blister packs.

35) Bags lined with films of 3) or 4).

36) Squeezable tubes of 11) containing foods such as but not limited to ketchup, mustard, cheese, or mayonnaise, personal care products such as but not limited to toothpaste, creams, lotions or soaps, or industrial materials such as but not limited to caulking or adhesive.

37) Boxes or cartons of 17) containing orange juice, fruit juice, milk, soup, baby food, soup concentrate, soup, or pet food.

38) Films of 4) that wrap meats, cheese, fish, poultry, nuts, coffee, or other food.

39) Containers of 21) containing foods such as pet food, applesauce, stews, or soups; or containing medical products.

40) Containers of 1) containing detergents, fragrances or agrochemicals.

41) Containers of 18) containing baby foods, relishes, ketchup, mayonnaise, mustard, vinegar, flavorings, herbs.

42) Containers of 1) containing pharmaceuticals or medical equipment.

43) Containers of 1) containing pet food, dried fruit, food paste, meats, or other edibles.

44) Containers of 18) that contain pressurized products such as but not limited to beer, soda, carbonated water, shaving cream, expandable foams, insecticides.

Further, the LCPs of this invention can be used for producing fibers and as coating agents and also as adhesives and paints.

Film Manufacture

The actual making of the film, multi-layer film, and corresponding film structures according to the instant invention can generally be by any such method as practiced in the art. As such, the film and film structures can be typically cast, laminated, extruded, co-extruded and the like including orientation (either uniaxially or biaxially) by various methodologies (e.g., cast film, cast film followed by orientation, or blown bubble techniques).

Films or sheets of polymeric materials employed to make a package of this invention, in principle, can be either a single layer or multilayer polymeric structure or multicomponent structure comprising polymeric and nonpolymeric materials. Also, in principle, any such film grade polymeric resin or material as generally known in the art of packaging can be employed. Typically, a multilayer polymeric structure is to be employed. Typically the multilayer polymeric film or sheet will involve at least three categorical layers including, but not limited to, an outermost structural or abuse layer, an inner barrier layer, and an innermost layer making contact with and compatible with the intended contents of the package and capable of forming seals necessary for enclosing the product to be contained within the package. The seals are preferably formed of heat-sealable polymers. Other layers may also be present to serve as adhesive or "tie" layers to help bond these layers together.

Structural or abuse layers are typically oriented polyester or oriented polypropylene, but can also include oriented polyamide. These layers are preferably reverse-printable and advantageously unaffected by the sealing temperatures used to make the package, since the package is often sealed through the entire thickness of the multilayer structure. These layers may also be made opaque by adding pigments such as titanium dioxide.

The inner layer can include one or more barrier layers, depending on which atmospheric conditions (oxygen, humidity, ethylene, carbon dioxide) that potentially can affect the product inside the container, but at least one of these layers must comprise the present LCPs. Conventional oxygen barrier layers include poly(co-ethylene/vinyl alcohol) having from about 20 to about 40 mole % ethylene ("EVOH"), poly(meta-xylylene adipamide), and polyvinylidene chloride. Whereas the gas barrier properties of both EVOH and poly(meta-xylylene adipamide) are dependent on relative humidity, LCPs of this invention are relatively insensitive to humidity and act as a barrier to moisture transmission. LCPs of this invention are usually more thermally stable than PVDC copolymer. As such, LCPs of this invention are useful for replacing EVOH, poly(meta-xylylene adipamide), or PVDC as the barrier layer in packaging applications. Other barrier layers can be, for example, PVDC homopolymer, metallized polypropylene (PP) or aluminum foil, silica, alumina, carbon or composites of the same as well as related copolymers thereof. Barrier layer thickness will depend on the sensitivity of the product and the desired shelf life.

The structure and barrier layers can be combined to comprise several layers of polymers that provide effective barriers and bulk mechanical properties suitable for processing and/or packaging the product, such as clarity, toughness and puncture-resistance.

In some cases, a sheet comprising an LCP of this invention is formed into a shaped article such as a tray, cup, bottle or the like and additional closure means such as caps, lids or films may be used to complete a container and enclose the contents. In such cases, a sealant layer may not be required, or may be incorporated in the closure means.

In other cases, the multilayer structure comprising an LCP of this invention may be a film or sheet that is sealed to itself to form a container or package of this invention. In such cases, the innermost layer of the package is the sealant. The sealant is selected to have minimum effect on taste or color of the contents, to be unaffected by the product, and to withstand sealing conditions (such as liquid droplets, grease, dust, or the like). The sealant is typically a polymeric layer or coating that can be bonded to itself (sealed) at temperatures substantially below the melting temperature of at least one of the other layers, preferably the outermost layer so that the outermost layer's appearance will not be affected by the sealing process and will not stick to the jaws of the sealing bar. Typical sealants used in multilayer packaging films useful in this invention include ethylene polymers, such as low density polyethylene (LDPE), linear low density polyethylene (LLDPE), metallocene polyethylene (mPE), or copolymers of ethylene with vinyl acetate (EVA) or methyl acrylate or copolymers of ethylene and acrylic (EA) or methacrylic acid (EMA), optionally as ionomers (i.e., partially neutralized with metal ions such as Na, Zn, or Mg). Typical sealants can also include polyvinylidene chloride (PVDC) or polypropylene copolymers. Sealant layers are typically from about 10 to about 60 µm thick. In some cases, in addition to functioning as an oxygen barrier, LCPs of this invention are also suitable as a sealant layer. Whereas conventional LCPs are difficult to heat seal under practical heat-seal conditions, LCPs of this invention can be sealed at temperature ranges from about 210° C. to about 240° C.

Polyamides suitable for use herein include aliphatic polyamides, amorphous polyamides, or a mixture thereof. "Aliphatic polyamides" as the term is used herein can refer to aliphatic polyamides, aliphatic copolyamides, and blends or mixtures of these. Preferred aliphatic polyamides for use in the invention are nylon 6, nylon-6.6/6 copolymer, blends and mixtures thereof. Polyamides such as nylon 6.6/6 are commercially available under the tradenames "Ultramid C4" and "Ultramid C35" from BASF, or under the tradename "Ube 5033FXD27" from Ube Industries Ltd.

The film may further comprise other polyamides such as those described in U.S. Pat. Nos. 5,408,000; 4,174,358; 3,393,210; 2,512,606; 2,312,966 and 2,241,322, the contents of which are incorporated herein by reference.

The film may also comprise partially aromatic polyamides. Some suitable partially aromatic copolyamides for use in the present invention are the amorphous nylon resins commercially available under the tradename Selar® PA from E.I. du Pont de Nemours and Company or commercially available under the tradename Grivory® G 21 from EMS-Chemie AG, for example.

Polyolefins suitable for use in the present invention are selected from polypropylene or polyethylene polymers and copolymers comprising ethylene or propylene. Polyethylenes useful for use herein can be prepared by a variety of methods, including well-known Ziegler-Natta catalyst polymerization (see for example U.S. Pat. Nos. 4,076,698 and 3,645,992), metallocene catalyst polymerization (see for example U.S. Pat. Nos. 5,198,401 and 5,405,922) and by free radical polymerization. Polyethylene polymers useful herein can include linear polyethylenes such as high-density polyethylene (HDPE), linear low-density polyethylene (LLDPE), very low- or ultra-low density polyethylenes (VLDPE or ULDPE) and branched polyethylenes such as low-density polyethylene (LDPE). The densities of polyethylenes suitable for use in the present invention range from 0.865 g/cm$^3$ to 0.970 g/cm$^3$. Linear polyethylenes for use herein can incorporate alpha-olefin comonomers such as butene, hexene or octene to decrease their density within the density range so described.

Polypropylene polymers useful in the practice of the present invention include propylene homopolymers, impact modified polypropylene and copolymers of propylene and alpha-olefins. A particularly useful polypropylene is PRO-FAX® 6323 polypropylene resin from Basell Polyolefins Inc. having an apparent melt viscosity at 100 1/s apparent shear of 550 Pa-s at 190° C. and 380 Pa-s at 230° C. and melt-point endotherm of 167° C.

Ionomeric resins ("ionomers") are ionic copolymers of an olefin such as ethylene with a metal salt of an unsaturated carboxylic acid, such as acrylic acid, methacrylic acid, or maleic acid, and optionally softening monomers. At least one or more alkali metal, transition metal, or alkaline earth metal cations, such as sodium, potassium or zinc, are used to neutralize some portion of the acidic groups in the copolymer resulting in a thermoplastic resin exhibiting enhanced properties. For example, "Ethylene/(meth)acrylic acid (abbreviated E/(M)AA)" means a copolymer of ethylene (abbreviated E)/acrylic acid (abbreviated AA) and/or ethylene/methacrylic acid (abbreviated MAA) which are at least partially neutralized by one or more alkali metal, transition metal, or alkaline earth metal cations to form an ionomer. Terpolymers can also be made from an olefin such as ethylene, an unsaturated carboxylic acid and other comonomers such as alkyl (meth)acrylates to provide "softer" resins that can be neutralized to form softer ionomers. Ionomers are known conventionally and their method of preparation is described in, for example, U.S. Pat. No. 3,344,014.

Anhydride or acid-modified ethylene and propylene homo- and co-polymers can be used as extrudable adhesive layers (also known as "tie" layers) to improve bonding of layers of polymers together when the polymers do not adhere well to each other, thus improving the layer-to-layer adhesion in a multilayer structure. The compositions of the tie layers will be determined according to the compositions of the adjoining layers that need to be bonded in a multilayer structure. One skilled in the polymer art can select the appropriate tie layer based on the other materials used in the structure. Various tie layer compositions are commercially available under the tradename Bynel® from E.I. du Pont de Nemours and Company, for example. A particularly useful tie layer is BYNEL® 38E536 co-extrudable adhesive, having an apparent melt viscosity at 100 1/s apparent shear of 650 Pa-s at 190° C. and 500 Pa-s at 230° C. and melting point endotherms at 50 to 72° C.

It should be appreciated that various additives as generally practiced in the art can be present in the respective film layers, provided their presence does not substantially alter the properties of the barrier film or film structure. Thus, it is contemplated that various conventional additives used in polymer films can be present in films or sheets of this invention, including plasticizers, stabilizers, antioxidants, ultraviolet ray absorbers, hydrolytic stabilizers, anti-static agents, dyes or pigments, fillers, fire-retardants, lubricants, reinforcing agents such as glass fiber and flakes, processing aids, antiblock agents, release agents, and/or mixtures thereof.

A multilayer film structure useful in the present invention can be prepared by coextrusion as follows: dried granulates of the various components are melted in single screw extruders. The melt temperature is adjusted up or down to achieve a stable or laminar flow of the polymer melts in the die. Although LCPs of this invention can be melt processed at 190° C. or lower, higher adhesive levels with tie layers containing maleic anhydride are achieved in a melt above 220° C. The molten polymers are passed through a flat or circular die to form layered molten polymer film, sheet or tubing. The molten polymers exit the die and may be immediately stretched in the machine and/or transverse direction as melts to achieve goal thickness. The melt is then cooled by contact with cool air or water or a quench drum. Polymers can be converted into a film or sheet using other suitable converting techniques. For example, a film useful in the present invention can also be made by coextrusion of a film followed by lamination onto one or more other layers.

Examples of multilayer barrier structures suitable for use in this invention include, from outermost to innermost:

polyethylene/tie layer/LCP/tie layer/polyethylene-co-methyl methacrylate;
polypropylene/tie layer/LCP/tie layer/polyethylene;
polypropylene/tie layer/LCP/tie layer/polypropylene;
polypropylene/tie layer/LCP;
paperboard/LCP; and
polyamide/tie layer/LCP/tie layer/polyethylene.

The thermoplastic film may also be laminated or extrusion coated to a substrate such as foil, paper, paperboard or nonwoven fibrous material to provide a packaging material useful in this invention. For example, an LCP of this invention can be extrusion coated onto paperboard as follows: dried granulates are melted in single screw extruders. Although LCPs of this invention can be melt-processed at 190° C. or lower, higher adhesive levels with porous material such as paperboard are achieved above 300° C. melt. The molten polymer is passed through a flat die to form molten polymer curtain. The molten curtain drops into the moving porous substrate to be immediately pressed into that substrate and quenched by a quench drum.

The LCP-coated paperboard may be formed into a shaped article by folding to provide a rigid container such as a box or carton. A carton prepared from paperboard extrusion-coated with an LCP of this invention can be sealed by flame sealing. If the carton or box is formed from a structure of a high temperature film instead of paperboard, heat sealing of LCPs of this invention can be effected at about 240° C. Cartons constructed in this manner can be used to contain, for example, orange juice or other fruit juices, and milk or milk products.

It is well known that EVOH barrier layers experience suffer severe thinning at the bottom corners (i.e. the area of transition between the circular bottom and the sides of the substantially cylindrical shaped cup) of thermoformed multilayer layer cups. Several techniques have been used to alleviate that problem. For example, U.S. Pat. No. 5,972,447 uses blends of EVOH with polyethylene-co-methacrylate resins to reduce the amount of thinning of the EVOH barrier at the corners. In contrast, LCPs of this invention surprisingly show only minor thinning at the corners and are useful as the barrier layer in place of EVOH.

Surprisingly, paper, paperboard or cardboard (collectively paper) can be coated in a continuous process by contacting the paper with a molten (above the melting point or if amorphous above the glass transition temperature) film of the LCP and then quenching (cooling) the LCP in contact with the paper in between a pressure applying apparatus such as a quench roll. For example the LCP may be extruded through a slit die to form a molten LCP film, and then while molten brought in contact with moving paper so that the LCP coats the paper. Before the LCP solidifies completely, the LCP coated paper is put through quench rolls or the LCP (side) is contacted with a single quench roll while tension is applied to the paper [the temperature of the roll in contact with the LCP is below the solidification point (melting point or if amorphous glass transition temperature) of the LCP so the LCP does not stick to the roll], while the roll(s) apply pressure to the coated paper. It is believed the pressure improves the contact between the LCP and the paper and/or improves the adhesion to the paper. The amount of pressure required will be high enough to press the LCP melt onto the paper but low enough not to cause LCP melt to accumulate or "bank" on the upstream side of the nip. Such banking of LCP will cause irregular LCP thicknesses and/or poor appearance for the LCP on the downstream side of the nip and in the final extruded product. In general lower pressure would be used for higher temperatures melts, higher ratios of polymer melt throughput rate to paper take-off rate, and higher porosity paper and is readily determined by experimentation. One or both sides of the paper can be coated with the LCP, either simultaneously or sequentially. It is not necessary to create functional groups on the paper and/or LCP for adequate adhesion, but in some instances it may be helpful. For instance the surface of the paper may be flamed to create more functional groups thereon. It is preferred that the LCP coated paper comprises a container. Examples 11 and 12 herein further illustrate this process.

The packaging material may also be processed further by, for example but not limitation, printing, embossing, and/or coloring to provide a packaging material to provide information to the consumer about the product therein and/or to provide a pleasing appearance of the package.

Melting points and glass transition points are measured by Differential Scanning Calorimeter (DSC) at a heating rate of 10° C./min, using ASTM Method D3418. Melting points were taken as the peak of the melting endotherm, while glass transition points were taken as the midpoint of the measured transition. Melt viscosity was measured on a Kayeness capillary rheometer having a capillary of 30-mm length, 1-mm diameter, and 180-degree entrance angle.

In the Examples, the following materials are used:

AP—an "adhesive" polymer, Bynel® 38F586, an anhydride modified ethylene/vinyl acetate coextrudeable copolymer, having a melt index (ASTM D1238) at 190° C. of 3.0 and a melting point of 75° C., available from E. I. DuPont de Nemours & Co., Wilmington, Del. 19898 USA.

PE—Low density polyethylene, DuPont DPE 1640, having a melt index of 5 and a density of 0.92, available from E.I. DuPont de Nemours & Co., Wilmington, Del. 19898 USA.

PP—Polypropylene, MFR 12, Profax® 6323, available from Basell USA, Inc., Elkton, Md. 21921 USA.

EXAMPLE 1 p-Hydroxybenzoic acid (378.6 g), 315.8 g of poly(ethylene terephthalate), 20.4 g of 4,4'-biphenol, 206.3 g of hydroxy naphthoic acid, and 434.9 g of acetic anhydride were charged into an agitated 3-liter reaction vessel at room temperature. The agitator was of the helical ribbon type. The reaction vessel was fitted with a Vigreaux column and reflux splitter to permit removal of reaction byproduct. The mixture was deaerated three times under agitation by application of vacuum and refilling with nitrogen gas. The deaerated, agitated mixture was heated to reflux by raising a liquid metal bath whose temperature was set and held at 170° C. by external electric heaters. The refluxing mixture was held for one h under total reflux to permit the acetylation of all available hydroxyl groups in the ingredients. After one h, the temperature control set point on the liquid metal heating bath was raised 20° C. every 20 min until the set point was 300° C. During this period of increasing temperatures, the reflux ratio was controlled to give approximately two-to-one reflux-to-takeoff ratio. Once evolution of acetic acid byproduct slowed at the 300° C. bath temperature set point, the Vigreaux column and reflux splitter were removed and replaced with a three-neck flask with vacuum take-off. The flask was covered with dry ice to serve as a condenser/trap for any acetic acid removed from the reaction mixture from this point to the end of the process. While maintaining a constant 300° C. bath temperature controller set point, the absolute pressure in the reaction vessel and vacuum trap were reduced by about 17 kPa every 15 min by application of vacuum, until the pressure in the vessel was about 130 to 260 kPa (abs). The pressure was held at this level for the remainder of the run. This vacuum was maintained for approximately three h. As the torque required to turn the agitator increased, the agitator revolutions per minute (RPM) were decreased from the initial 50 RPM to a final value of 30 RPM. At the end of the three-hour period, the vacuum was shut off, the vessel was repressurized to atmospheric pressure with nitrogen, and the polymer was recovered by scraping out of the vessel with a spatula and then quenched in water.

The polymer had glass transition temperature of 75° C., but no melting point, when measured by DSC. The melt viscosity at 190° C. was 3100 Pa·s at an apparent shear rate of 100 sec$^{-1}$, and 600 Pa·s at an apparent shear rate of 1000 sec$^{-1}$. Approximately 95 µm thick films were prepared by pressing 3 g of polymer between hot (200° C.) platens in a compression press, and the films were then rapidly quenched to 23° C. Permeabilities (for methods see below) were 2.7 cm$^3$ oxygen-25 µm/m$^2$-day-atm, and 1.4 g water-25 µm/m$^2$-day.

EXAMPLE 2

A similar polymer was made by the same general method as in Example 1. It had an Inherent Viscosity in 50/50 trifluoroacetic acid/dichloromethane (v/v) at 19° C. of 1.16 dl/g., its melt viscosity at 100 1/s apparent shear was 2700 Pa-s at 190° C. and 380 Pa-s at 230° C. By DSC the resin had no melting endotherms between 20° C. and 350° C. This polymer is called polymer 2A herein.

In order to reduce the melt viscosity (molecular weight, see U.S. Pat. No. 6,294,618) this polymer was dry blended with 0.75% 4,4'-biphenol powder. The blend was fed into a 30-mm W&P trilobal extruder at 9 kg/hr. The screw was set to 150 rpm. The ten barrel sections were set at 250 to 280° C. in order to achieve a 300–315° C. melt temperature. The resulting polymer had an apparent viscosity at 100 1/s apparent shear of 1300 Pa-s at 190° C. and 180 Pa-s at 230° C. It had an inherent viscosity of 0.97 dl/g. The polymer had a glass transition temperature (Tg) of 72° C. The polymer was anisotropic by the TOT test. The polymer is called Polymer 2B herein.

EXAMPLE 3

Five-layer cast sheeting (a PP/AP/LCP/AP/PP sheet) was made from PP, AP, and Polymer 2B. Polymer 2B polymer was dried at 65° C. in air for 6 h prior to use. The resins were fed from single-screw extruders of 3.8-cm to 6.4-cm diameter at a total rate of about 70 kg/h. The PP and AP temperature set-points were 210° C. to 240° C. and 200° C. respectively. Polymer 2B was run at 195° C. The melt streams were joined in a 15-cm long neck with a 7.5-cm by 1.7-cm ellipsoidal cross section which tapered into a coathanger die 61-cm wide. The melt curtain (nominally 15-cm drop-length) ended in a nip between two quench rolls cooled with 21° C. water. Depending on takeoff speed the sheet thickness was varied from 600 to 750 µm. The thickness of the PP plus AP layers was 280 to 360 µm on one side and 230 to 300 µm on the opposite side. The layer of Polymer 2B in the sheet was 100 to 200 µm thick. The Polymer 2B layer was separated from the AP and PP for physical testing. Duplicate 2.54 cm wide film samples were tested on an Instron®Universal Test Instrument Model 1122 (Instron Corp, Canton, Mass., USA) at a 2.54 cm/min extension rate starting from an initial 2.54 cm jaw spacing. The 2B layer had an ambient secant modulus of 1.9 GPa at 2% strain and an elongation to break of 46 (+/−6)% in the direction transverse to the film direction. In the machine direction, the respective tensile values were 0.85 GPa and 18 (+/−3)%. These results demonstrate the desirable toughness necessary for most packaging applications. The adhesion between the AP layer and the Polymer 2B layer in the sheet was measured using the Instron Universal Testing Instrument using a 2.54 cm wide specimen. The combined PP and AP layers were pulled from the Polymer 2B layer at a 5.08 cm/min extension rate while the unseparated portion was held at a 90 degree angle to the direction of extension. The maximum force divided by the specimen width was the 90 degree T-pull value for the adhesion between the AP layer and the Polymer 2B layer. That value was 0.05 kgf/cm. This level of adhesion proved sufficiently high to allow the sheet to be processed downstream into articles.

EXAMPLE 4

Five-layer cast sheeting (PP/AP/LCP/AP/PP sheet) was made from PP, AP, and Polymer 2B. PP was fed from a 3.8-cm diameter single screw extruder at 200° C. AP was fed from a 3.2-cm diameter single screw extruder at 190° C. Polymer 2B was fed from a 2.5-cm diameter single screw extruder at 190° C. The total throughput rate was about 5.9 kg/hr. The melt streams were joined in a 1.9 cm diameter neck that was 15-cm long. The coat-hanger die had a 36-cm wide land with a 380-μm gap. The melt curtain (nominally 5-cm vertical drop length) ended in a nip between two quench rolls cooled with 20° C. water. Depending on takeoff speed the sheet thickness was varied from 480 to 540 μm. The thickness of the PP plus AP layers was 225 to 250 μm on the outside and inside. The Polymer 2B layer was 15 to 30 μm thick. The resulting Polymer 2B layer was separated from the rest of the structure and its permeability was measured. Water vapor transmission was measured on a Permatran®-W unit made by MOCON (Minneapolis, Minn. 55428, USA) using ASTM F1249 with liquid water on one side. The water vapor transmission for the Polymer 2B layer was 1.1 (+/−0.5) g water 25 μm/m$^2$ day at 38° C. and 100% relative humidity (RH) water driving force. The oxygen permeability was measured using ASTM Method D3985 on an Oxtran® unit made by MOCON. The value was 2.4 (+/−0.6) cm$^3$ oxygen 25 μm/m$^2$ day atm at 23° C. and 90% RH. The elongation to break was between 10 and 17%, indicating a tough film.

EXAMPLE 5

Multilayer sheet from Example 3 was cut into 53.3 cm squares. The sheet was applied in a horizontal position to a laboratory thermoformer (Labform® Model 1620 from Hydrotrim Corp., W. Nyack, N.Y., USA) for testing thermoformability in a batch-mode. Heat was applied from a 315° C. black-body radiator from above and below the sheet during a 30 to 40-second dwell time, during which time the surface temperature of the sheet rose toward the nominal forming temperature of polypropylene of 165° C. The mold was an unheated, uncooled ceramic mold to provide a shaped article that simulates a pet-food can measuring 3.5-cm depth and 7.5-cm diameter. At the end of the heat-cycle the sheet was immediately positioned over the mold and clamped to the mold perimeter. Vacuum from within the mold during 2 sec drew the sheet into the mold. The molded sheet was ejected after 15 sec. The sheet had completely reproduced the inside shape of the mold. A grid pattern marking the original sheet indicated that the new surface area for the can was created out of that part of the original sheet within the diameter of the can mold.

The thermoformed can was cut in half from one edge to the other edge through the center. The thickness of the inner and outer PP plus AP layer was compared with that of the Polymer 2B layer using a surface illumination and an optical microscope with digital micrometer calipers. Table 1 shows that Polymer 2B did not experience severe thinning at the bottom corner of the can (positions at 3 to 5 mm and 9.6 to 11 mm).

TABLE 1

| Distance from edge of can (mm) | PP + AP (μm) | Polymer 2B (μm) | PP + AP (μm) | Ratio PP + AP to Polymer 2B |
|---|---|---|---|---|
| 0 | 427 | 180 | 381 | 2.2 |
| 0 | 292 | 193 | 232 | 1.4 |
| 1 | 222 | 102 | 206 | 2.1 |
| 2 | 150 | 57 | 131 | 2.5 |
| 3.5 | 97 | 51 | 95 | 1.9 |
| 4 | 103 | 67 | 99 | 1.5 |
| 5 | 166 | 79 | 147 | 2.0 |
| 6 | 217 | 86 | 173 | 2.3 |
| 7 | 218 | 88 | 204 | 2.4 |
| 7.5 | 229 | 93 | 194 | 2.3 |
| 8 | 210 | 90 | 175 | 2.1 |
| 8.5 | 178 | 91 | 152 | 1.8 |
| 9 | 157 | 81 | 117 | 1.7 |
| 9.6 | 118 | 60 | 86 | 1.7 |
| 10 | 114 | 58 | 103 | 1.9 |
| 10.5 | 98 | 60 | 90 | 1.6 |
| 11 | 132 | 69 | 117 | 1.8 |
| 12 | 193 | 99 | 188 | 1.9 |
| 13 | 254 | 132 | 229 | 1.8 |

EXAMPLE 6

Thermoformed cups from Example 5 were measured for height and diameter before being steam autoclaved at 121° C. for 30 minutes using a wet cool-down cycle. Surprisingly, the resulting cups were unchanged in diameter and height even though Polymer 2B is soft at 121° C. The oxygen barrier properties of the Polymer2B were also essentially unchanged after treatment by steam autoclave at 121° C. for 30 min.

EXAMPLE 7

The multilayer sheet from Example 3 was cut into 53.3 cm squares and each square was thermoformed into a deep cup of 5.5-cm depth and 8.5-cm diameter using 330° C. black-body radiative heating and a 40-second dwell time. The inner shape of the mold was completely replicated. Analysis of the thickness of the various layers from one edge to the center of the cup revealed no severe thinning of the Polymer 2B layer at the bottom corner (positions from 5 to 6 mm) of the formed cup (Table 2).

TABLE 2

| Distance from edge of cup (mm) | PP + PA (μm) | Polymer 2 (μm) | PP + PA (μm) | Ratio PP + PA to Polymer 2B |
|---|---|---|---|---|
| 0 | 333 | 89 | 241 | 3.2 |
| 0 | 394 | 117 | 344 | 3.2 |
| 0 | 382 | 132 | 343 | 2.7 |
| 1 | 295 | 89 | 224 | 2.9 |
| 2 | 203 | 79 | 142 | 2.2 |
| 3 | 147 | 29 | 137 | 4.9 |
| 4 | 97 | 32 | 97 | 3.0 |
| 5 | 67 | 18 | 58 | 3.5 |

TABLE 2-continued

| Distance from edge of cup (mm) | PP + PA (μm) | Polymer 2 (μm) | PP + PA (μm) | Ratio PP + PA to Polymer 2B |
|---|---|---|---|---|
| 5 | 61 | 20 | 57 | 2.9 |
| 6 | 76 | 30 | 72 | 2.4 |
| 7 | 77 | 43 | 74 | 1.8 |
| 8 | 104 | 29 | 94 | 3.4 |
| 9 | 102 | 51 | 100 | 2.0 |
| 10 | 104 | 37 | 102 | 2.8 |

EXAMPLE 8

A polymer similar to Polymer 2B but having a melt viscosity of 1000 Pa-s at 190° C. and 83 P-s at 230° C., all at a shear rate of 100 sec$^{-1}$, was extruded at 210° C. through a 1.9-cm diameter single screw extruder. The melt flowed through a 2.5-cm diameter annular die. The melt was blown into an upward bubble with a diameter of about 5 cm. The resulting film was 76 μm thick.

EXAMPLE 9

Five-layer blown-film was made on a Brampton Engineering blown film semiworks using PE, AP, and Polymer 2B. The film structure was PE on the exterior sides, Polymer 2B in the middle, and AP bonding the Polymer 2B to the PE layers. At a total throughput rate of about 20 kg/hr, the resins were fed from separate single screw extruders so that the melt temperatures were 190° C. The melt streams flowed into an annular die of 15-cm diameter and 1.68-mm gap. The film was extruded upward and expanded with air to a diameter of about 30 cm. The total film thickness was 100 μm. The Polymer 2B thickness was 5 to 6 μm and of uniform appearance. The oxygen permeability of the multilayer film was 3.5 cm$^3$ oxygen-25 μm of Polymer 2B/m$^2$-day-atm at 23° C. which indicates a defect-free and uniform Polymer 2B layer. A sample of the multilayer film was tested on a laboratory built Gelbo Flex Tester, using ASTM Method F392-93, Condition A, except the unit was run for a specific number of cycles and stopped. The oxygen permeability rate was measured after each decade of flexing. After 0, 10, 100, and 1000 flexes, the oxygen permeability was 3, 5.8, 3, and 320 cm$^3$ oxygen-25 μm/m$^2$-day-atm. These results demonstrate good durability of the Polymer 2B layer.

EXAMPLE 10

A monolayer of the Polymer 2B film was separated from the multilayer sheet of Example 3. A 2.5-cm wide sample was uniaxially oriented while in contact on both sides with 0.6-cm thick copper blocks heated to preset temperatures. High tension was maintained on the film during its rapid cool-down. The width and thickness was measured before and after orientation. Inspection of the results provided in Table 3 shows that, at orientation temperature above 105° C., the film could be given substantial stretch.

TABLE 3

| Block Temperature, ° C. | Before stretching | | After stretching | |
|---|---|---|---|---|
| | Width, cm | Thickness, μm | Width, cm | Thickness, μm |
| 92 | 2.5 | 53 | 2.1 | 53 |
| 100 | 2.5 | 56 | 2.1 | 53 |
| 105 | 2.5 | 46 | 1.6 | 41 |
| 110 | 2.5 | 46 | 1.5 | 25 |

Samples of the above oriented film were exposed to air heated to 100° C. The lengths of the samples were measured before and after heating respectively one sample 5 cm before and 3 cm after and another sample 4.9 cm before and 2.9 cm after. This result demonstrates from 2% to 5% shrinkage.

EXAMPLE 11

Kraft paper was extrusion coated with Polymer 2B on a continuous extrusion coating line as follows. Kraft paper (89-μm thickness) was flame treated offline. Polymer 2B was extruded at about 220 kg/hr through a single screw extruder at 225° C. melt temperature. The melt flowed through a 61 cm wide coat-hanger die having a 1000-μm wide opening. The melt curtain fell 15 cm into a moving web of the Kraft paper traveling between 3 and 8 m/minute. Immediately after contact the melt/paper entered a nip having quench drums at 60° C. At a lower takeoff speed a sample having a 163 μm coating of Polymer 2B was generated. At a higher speed a sample having a 66 μm coating of Polymer 2B was generated. Testing of the adhesion between Polymer 2B using a 2.54 cm wide specimen and a 90 degree T-pull on the Instron Universal Test Instrument gave 0.11 kgf/cm and 0.43 kgf/cm for the 66- and 163-μm thick samples respectively.

EXAMPLE 12

An extrusion coating trial similar to Example 11 was conducted except that Polymer 2A was used in place of Polymer 2B and the melt temperature was 300° C. A sample of coated Kraft paper having 48 μm of Polymer 2A had an adhesion of 0.09 kgf/cm and a sample coated with 33 μm of polymer 2A had an adhesion of 0.08 kgf/cm. In both cases the failure of the peel primarily was due to a cohesive failure within the Kraft paper.

EXAMPLE 13

Articles created by folding or shaping thin sheet or films having a layer of polymer on one side will usually require sealing of the polymer to itself in a fin seal. Such sealing requires heating the seal layer by applying heat from one or both of the opposite sides. Paper coated with Polymer 2B was prepared in the laboratory by pressing a 127μm thick film of Polymer 2B onto 99 μm thick paper at 210° C. using 35 MPa pressure for 1 min. The coated paper had a polymer-rich coating. The polymer-rich sides were bonded to each other in a bench top Sentinel® heat sealer, Model12ASL (Packaging Industries, Inc., Hyannis, Mass., USA) using a 2.54-cm wide bar and 280 kPa pressure. When the control temperature of the bar was 210° C. and the dwell time was 3 sec or longer the polymer bonded to itself as indicated by cohesive failure in the paper layer. When the bar temperature was 230° C. and the dwell time was 1.5 seconds the polymer bonded to itself.

EXAMPLE 14

Articles created from thick sheet such as coating paperboard for cartons require heat-sealing by application of heat directly to the heat seal layer, usually by direct application of flame. Polymer 2B was heat sealed by this method by use of a propane torch. Paperboard coated with Polymer 2B was prepared in the laboratory by pressing a 127 μm thick sheet of Polymer 2B into 463 μm thick paperboard at 210° C. using 120 MPa pressure for 1 min. The coated paperboard had a polymer-rich coating. The paperboard was cut into 2.5 cm wide strips, each of which was folded to allow the polymer-rich sides to face each other. A propane flame was applied to the inside of the fold for 1 sec and immediately thereafter light pressure was applied for 3 sec to a 2.5 cm square area to bond the molten polymer. Tee-pull tests (see above) of the sample gave a 0.6 kgf/cm pull force. This result indicates that Polymer 2B was sealed to itself.

EXAMPLE 15

Lap seals require the inside of a film to be heat sealed to the outside. To demonstrate this type of seal a 1320 μm thick sheet of a terpolymer of ethylene with 28 mole percent n-butyl acrylate and 8.8 mole percent glycidyl methacrylate was melted while in contact with a 152-micron film of Polymer 2B. The press conditions were 1 min preheat and 1 min hold at either 210° C. or 230° C. After rapidly quenching the sample to ambient temperature, the terpolymer was pulled from polymer 2A at a 5.08 cm/min rate on an Instron® Universal Test Instrument. The 90 degree T-pull results were 0.9 kgf/cm and 3 kgf/cm at the 210° C. and 230° C. press conditions, respectively. These results demonstrate the heat sealability of LCPs of this invention to another polymer and the utility of glycidyl methacrylates to form a basis of co-extrudable adhesives for LCPs of this invention.

EXAMPLE 16

A multilayer blown film was made that was similar to that of Example 9 except that in place of one PE layer a copolymer of ethylene with 10 mole percent methacrylic acid neutralized with 1.5% sodium cation was used (i.e. an ionomer). In place of the other PE layer PP was used. The ionomer plus tie layer thickness was 93 μm, total thickness was 144 μm, and the Polymer 2B thickness was 4.5 μm. A 5 cm by 10 cm rectangular pouch was made from two of these multilayer films by heat sealing, on three edges, fin-seals of copolymer to copolymer by applying pressure and 100° C. heat from jaws applied to the outside surfaces. Approximately 0.5 ml of peppermint oil (available from Essential Oils Co., Portland, Oreg., USA) was placed inside the pouch. Spearmint oil was placed in another identical pouch. The pouches were then sealed on their fourth edges. Similar pouches were constructed from 100 μm thick PE film and filled with peppermint and spearmint oils. One h after the pouches were sealed, strong flavor aromas were being emitted from the polyethylene pouches. No odor was being emitted from the multilayer pouches containing Polymer 2B. This result demonstrates the utility of articles containing LCPs of this invention to act as flavor and odor barriers.

EXAMPLE 17

Pouches were made using the multilayer film described in Example 16 and in a fashion similar to that above example, except approximately 13 cm by 15 cm in size. Each pouch was sealed using an impulse sealer on three sides, filled with about 500 ml of water, and then sealed on the fourth side. A small amount of entrapped air remained. One pouch was sealed through the ionomer layers. Another pouch was sealed through the PP layer. The pouches were steam sterilized or autoclaved at the Steris Corp (Erie, Pa., USA) laboratory in a Finn-Aqua® steam-air mix sterilizer at 121° C. and 350 kPa pressure for 30 min. The pouch sealed through the ionomer layer burst during the sterilization cycle. The pouch sealed through the PP layer remained intact without any leaks. These results demonstrate the utility of LCPs of this invention for steam-sterilizable pouches having oxygen sensitive contents.

EXAMPLE 18 p-Hydroxybenzoic acid (452.7 g), 419.6 g of poly(ethylene terephthalate), 40.7 g of 4,4'-biphenol, and 405.8 g of acetic anhydride were charged into an agitated 3-liter reaction vessel at room temperature. The agitator was of the helical ribbon type. The reaction vessel was fitted with a Vigreaux column and reflux splitter to permit removal of reaction byproduct. The mixture was deaerated three times under agitation by application of vacuum and refilling with nitrogen gas. The deaerated, agitated mixture was heated to reflux by raising a liquid metal bath whose temperature was set and held at 170° C. by external electric heaters. The refluxing mixture was held for one hour under total reflux to permit the acetylation of all available hydroxyl groups in the ingredients. After one hour, the temperature control set point on IS the liquid metal heating bath was raised 20° C. every 10 min until the set point was 230° C. The bath temperature control set point was held at 230° C. for one h, and then the set point was again raised 20° C. every 10 min until the bath temperature set point was 305° C. During this period of increasing temperatures, the reflux ratio was controlled to give approximately two-to-one reflux-to-takeoff ratio. Once evolution of acetic acid by-product slowed at the 305° C. bath temperature set point, the Vigreaux column and reflux splitter were removed and replaced with a three-neck flask with vacuum take-off. The flask was covered with dry ice to serve as a condenser/trap for any acetic acid removed from the reaction mixture from this point to the end of the process. While maintaining a constant 305° C. bath temperature controller set point, the absolute pressure in the reaction vessel and vacuum trap were reduced by about 17 kPa every 15 min by application of vacuum, until the pressure in the vessel was about 130 to 260 kPa (abs). The pressure was held at this level for the remainder of the run. This vacuum was maintained for approximately three h. As the torque required to turn the agitator increased, the agitator revolutions per minute (RPM) were decreased from the initial 30 RPM to a final value of 10 RPM. At the end of the three-h period, the vacuum was shut off, the vessel was repressurized to atmospheric pressure with nitrogen, and the polymer was recovered by scraping out of the vessel with a spatula and then quenched in water.

The polymer product had an inherent viscosity of 1.049 dl/g as measured in trifluoroacetic acid/dichloromethane via the Goodyear technique. Polymer melt viscosity was 173 Pa-sec measured at 230° C. and 1000/sec shear rate.

What is claimed is:

1. A process for the manufacture of a liquid crystalline polymer comprising:

(a) contacting, in the absence of added solvent, a partially aromatic polyester, having repeat units of the formula

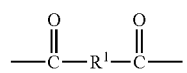

(I)

and

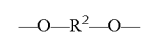

(II), with one or more compounds of the formula HO—R³—CO₂H (III), one or more compounds of the formula HO—R⁴—OH (IV), and a carboxylic acid anhydride, under conditions to form esters of (III) and (IV) by reaction with said carboxylic add anhydride, and (b) heating the mixture resulting from (a) at a temperature and for a sufficient amount of time to form a liquid crystalline polymer wherein each R¹ is independently hydrocarbylene or substituted hydrocarbylene;

each R² is independently alkylene or substituted alkylene;

each R³ is independently arylene or substituted arylene; and each R⁴ is independently arylene or substituted arylene;

and provided that (IV) is present in an amount, based on the amount of (II) present in said partially aromatic polyester, to achieve a total diol stoichiometric excess of 0.5 to 15 mole percent.

2. The process of claim 1 wherein said carboxylic anhydride is acetic anhydride.

3. The process of claim 2 wherein:

from 90 to 100 mole percent of R¹ is p-phenylene, and from 0 to 10 mole percent of R¹ is m-phenylene;

from 90.0 to 100 mole percent of R² is —CH₂CH₂— and from 0 to 10.0 mole percent of R² is —CH₂CH₂OCH₂CH2—;

(V) is —O—R⁴—O—;

each R4 is 4,4'-biphenylene;

(III) is a mixture of

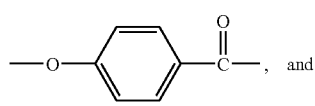

(IIIA)

and

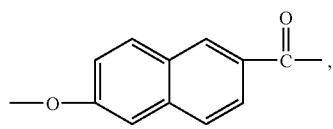

(IIIB)

the molar ratio of (I):[(II)+(V)] is about 1.0:1.0;

the molar ratio of (I):[(IIIA)+(IIIB)] is about 1.0:1.0 to about 1.0:4.0; and the molar ratio of (IIIA):(IIID) is about 5:1 to about 1:2; and the stoichiometric excess is 1 to 3 percent.

4. The product of the process of any one of claims 1, 2, or 3.

5. The process as recited in claim 1 comprising the additional step of treating the liquid crystalline polymer with a monomeric functional compound to reduce its melt viscosity at a shear rate of 1000 sec⁻¹ by at least 10%.

6. A container comprising the product of claim 4.

7. The container of claim 6 that is a pouch or a bag.

8. The container of claim 6, comprising said liquid crystalline polymer, that is a rigid container selected from the group consisting of a tray, cup, can, bucket, tub, box, pipe, bawl, tube, parison, and carton.

9. The container of claim 8 that is a carton prepared from paperboard extrusion-coated with said liquid crystalline polymer.

10. The container of claim 8 that is a thermoformed multilayer layer cup comprising said liquid crystalline polymer as a barrier layer.

11. The container of claim 10 formed fmm a multilayer structure comprising exterior layers comprising polypropylene and an inner layer comprising said liquid crystalline polymer, with co-extrudable adhesive layers bonding said polypropylene layers to said liquid crystalline polymer layer.

12. A film or sheet comprising the product of any one of claims 1, 2 or 3.

13. The film of claim 12 that is a monolayer blown film comprising said liquid crystalline polymer.

14. The film or sheet of claim 12 that is a multilayer structure comprising at least one layer comprising said liquid crystalline polymer.

15. The film or sheet of claim 14 wherein said muitilayer structure comprises exterior layers comprising polypropylene and an inner layer comprising said liquid crystalline polymer, with co-extrudable adhesive layers bonding said polypropylene layers to said liquid crystalline polymer layer.

16. A laminate comprising the film or sheet of claim 12 bonded, by lamination, extrusion coating or co-extrusion coating, to a substrate selected from the group consisting of paper, paperboard, aluminum foil, fabric, nonwoven material, and a film substrate comprising another polymer selected from the group consisting of poly(vinylidene fluoride), nylon-6,6, biaxially oriented polypropylene, biaxially oriented poly(ethylene terephthalate), and polyimide.

17. A laminate comprising kraft paper extrusion coated with the liquid crystalline polymer film or sheet of claim 12.

18. A laminate comprising paperboard extrusion coated with the liquid crystalline polymer film or sheet of claim 12.

19. The container of claim 9 which also comprises a heat seal wherein said liquid crystalline polymer forms both sides of said heat seal.

20. The film or sheet of claim 14 that shrinks in any direction more than 4% when heated to 90° C.

21. A process for coating paper with a liquid crystalline polymer, comprising, contacting a surface of a paper sheet with a molten sheet of liquid crystalline polymer to form a coated paper sheet, then while said liquid crystalline polymer on said coated paper sheet is still at least partially molten applying pressure by having a surface which contacts said liquid crystalline polymer on coated paper sheet, said surface having a temperature below a solidification temperature of said liquid crystalline polymer and which applies pressure to said liquid crystalline polymer on coated paper sheet to produce a liquid crystalline polymer coated paper sheet wherein said liquid crystalline polymer is solid.

22. The process as recited in claim 21, wherein said liquid crystalline polymer comprises a liquid crystalline polymer having repeat units of the formulae

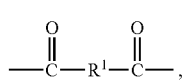

(I)

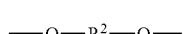

(II)

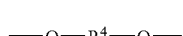

(V)

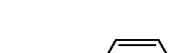

(IIIA)

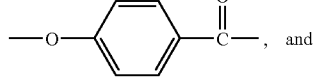

and

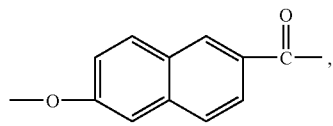

(IIIB)

wherein;

each $R^1$ is independently hydrocarbylene or substituted hydrocarbylene;

each $R^2$ is independently saturated hydrocarbylene or substituted saturated hydrocarbylene;

each $R^4$ is independently arylene or substituted arylene;

(V) is about 0.4 to about 32 mole percent of the total of (I) present;

the molar ratio of (I):[(II)+(V)] is about 1.0:1.0;

the molar ratio of (I):[(IIIA)+(IIIB)] is about 1.0:1.0 to about 1.0:4.0; and the molar ratio of (IIIA):(IIIB) is about 5:1 to about 1:2.

23. The process as recited in claim 21 wherein said suface is one or two quench rolls.

24. The product of the process of claim 21.

25. A container comprising the product of claim 24.

* * * * *